UNITED STATES PATENT OFFICE.

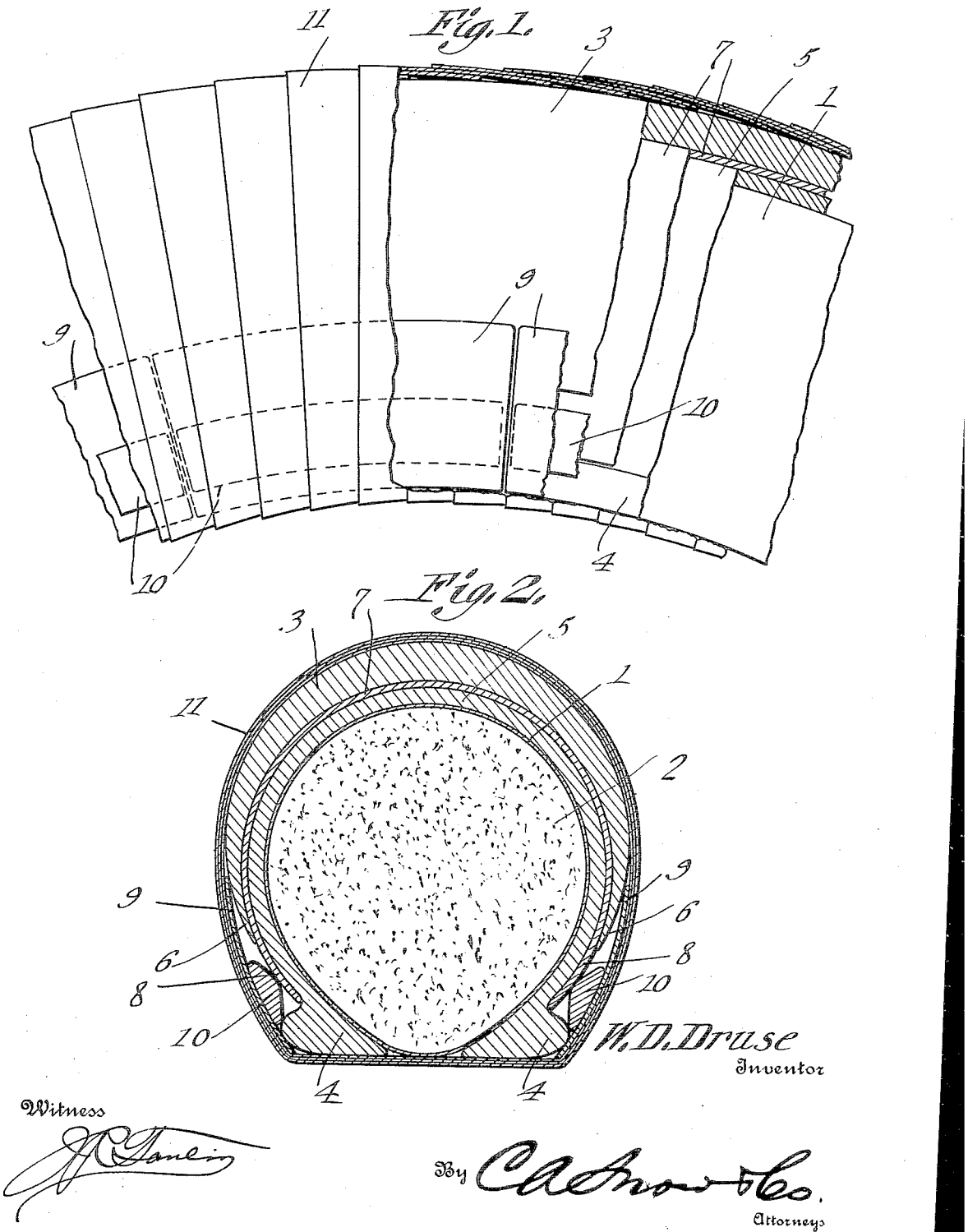

WARREN D. DRUSE, OF FARMINGTON, MISSOURI.

METHOD OF MAKING TIRES.

1,319,575.  Specification of Letters Patent.  Patented Oct. 21, 1919.

Application filed March 10, 1919. Serial No. 281,826.

*To all whom it may concern:*

Be it known that I, WARREN D. DRUSE, a citizen of the United States, residing at Farmington, in the county of St. Francois and State of Missouri, have invented a new and useful Method of Making Tires, of which the following is a specification.

It is the object of this invention to provide a novel method for making a strong and relatively perfect tire out of two imperfect tires, one of which is injured adjacent its beads, the other of which is injured in its tread portion.

With the above and other objects in view, the invention consists in the process hereinafter described, and in the steps thereof, it being understood that, within the scope of what is claimed, a mechanic might work such changes as his skill suggests, without departing from the spirit of the invention.

In the accompanying drawings:—

Figure 1 shows in side elevation, a structure wherein the process has been carried out, parts being broken away successively; Fig. 2 is a cross section of the device shown in Fig. 1.

In carrying out the present method there is employed a first tire casing 5 having beads 4, and a second tire casing 3, the imperfect beads of which are cut off, the casing 3 being beveled in the cutting operation, as shown at 6. A layer of vulcanizable material 7, which may be raw rubber, combined with other substances if desired, is placed between the casings 3 and 5, the second casing 3 being superposed on the first casing 5. The first casing 5 is sustained internally in any desired way, preferably by means of a flexible core which may consist of a bag 1 inclosing a mass of sand 2. The core, however, may be made as desired.

The spaces between the beads 4 of the first casing 5 and the second casing 3 are bridged by means of plates 9, ordinarily made of galvanized iron or some other suitable material. The casings 5 and 3 and the bridge plates 9 are wrapped in any desired way, preferably by means of a spirally disposed tape 11. Spacers 10, which may be made of hard rubber, are introduced behind the plates 9, to sustain the plates, and to tighten up the wrapping 11, the spacers ordinarily bearing against the longitudinal edges 8 of the layer 7, which extends beyond the longitudinal edges of the casing 3.

The structure thus produced is vulcanized, in a kettle or otherwise, the wrapping 11, the plates 9 and the spacers 10 being removed, after the process of vulcanization has been completed.

The process above described affords a simple method whereby a relatively perfect tire casing may be made out of two casings which are damaged more or less, and it is to be observed that, owing to the use of the bridging plates 9 and the spacers 10, the structure to be vulcanized will be held in proper shape, about the core 1—2, adjacent to the beads 4, during the process of vulcanization to tighten the tape; subjecting the structure thus produced to vulcanization; and removing the tape, the plates and the spacers.

Having thus described the invention, what is claimed is:—

A method of combining a first imperfect tire casing having beads, with a second imperfect tire casing devoid of beads, which consists in placing vulcanizable material between the casings and superposing the second casing on the first casing; sustaining the first casing internally; bridging the spaces between the beads of the first casing and the second casing with plates; wrapping the casings and the plates; sustaining the plates internally; subjecting the structure thus produced to vulcanization; unwrapping the casings and the plates; and removing the plates and the sustaining means.

In testimony that I claim the foregoing as my own, I have hereto affixed my signature in the presence of two witnesses.

WARREN D. DRUSE.

Witnesses:
 EDNA L. HUGHES,
 J. CLYDE AKERS.